UNITED STATES PATENT OFFICE.

ERHARD HARDMEYER, OF KOKOMO, INDIANA.

COMPOSITION FOR CONVERTING IRON INTO STEEL.

SPECIFICATION forming part of Letters Patent No. 658,438, dated September 25, 1900.

Application filed June 11, 1900. Serial No. 19,973. (No specimens.)

*To all whom it may concern:*

Be it known that I, ERHARD HARDMEYER, a citizen of the United States, residing at Kokomo, in the county of Howard and State of Indiana, have invented a new and useful Composition for Converting Iron into Steel, of which the following is a specification.

My composition consists of the following ingredients, combined in proportions stated, viz: albumen, one hundred pounds; Epsom salts, (magnesium sulfate, $MgSO_4$,) fifteen pounds. The ingredients have to be well dried, pulverized, and mixed.

The articles or bars of iron to be converted into steel are put into cast-iron receptacles or retorts of clay in intervals of from one-half of an inch to one and a half inches, and the pulverized compound is put between well packed, and the receptacle is then hermetically closed and subjected to a bright red or white heat in the furnace from eight to twenty-four hours, according to the depth of surface to be carburized, and from twelve to forty-eight hours for complete carburization, according to the dimensions of the iron.

What I claim as my invention, and desire to secure by Letters Patent of the United States, is—

The herein-described composition of matter for converting iron into steel consisting of albumen one hundred pounds, and Epsom salts fifteen pounds, substantially as described.

In testimony whereof I have signed my name to this specification in the presence of two subscribing witnesses.

ERHARD HARDMEYER.

Witnesses:
GOTTFRIED SCHWENGER,
WILLIAM McLAUGHLIN.